July 4, 1933. E. O. COREY 1,916,826
FLANGE OILER
Filed Sept. 16, 1930
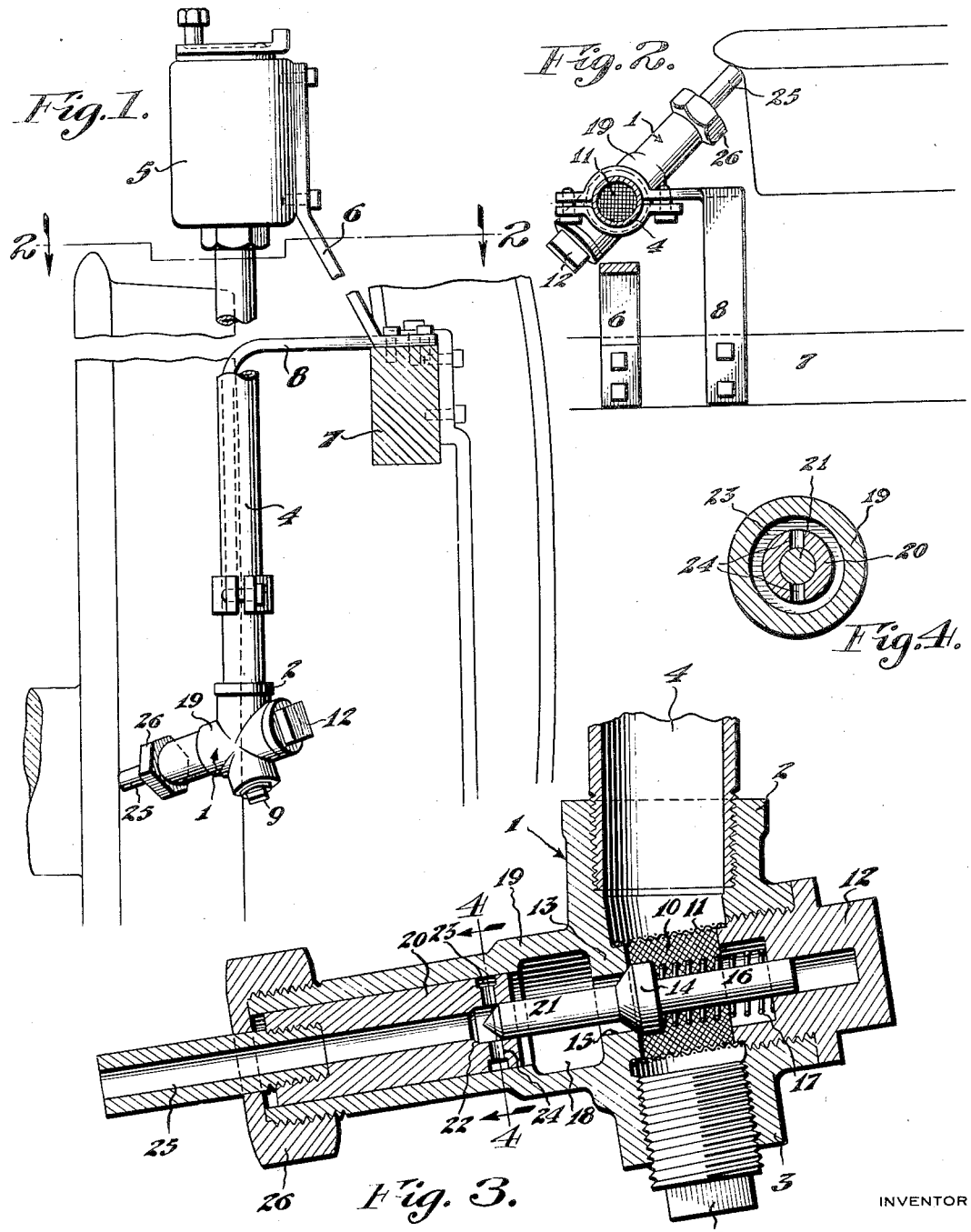
INVENTOR
Elmer O. Corey
BY
Wood & Word ATTORNEYS Patented July 4, 1933

1,916,826

UNITED STATES PATENT OFFICE

ELMER O. COREY, OF NORWOOD, OHIO, ASSIGNOR TO THE EDNA BRASS MANUFACTURING COMPANY, OF CINCINNATI, OHIO, A CORPORATION OF OHIO

FLANGE OILER

Application filed September 16, 1930. Serial No. 482,250.

The invention relates to improvements in oilers or lubricators of gravity or self-feeding type having particular utility for oiling the flanges of railway wheels in which connection it will be exemplified although not limited exclusively for such use.

The oiler is arranged for distributing oil or fluid lubricant from a nozzle dispensed thereto in regulated or measured quantities and the oiler operated automatically by motions longitudinally of the axis of the nozzle by either the part sustaining the oiler or the part to be lubricated, causing the nozzle to be reciprocated and depressed into the body of the oiler, actuating a plunger and valve device, opening to the oil supply and admitting oil into a dispensing chamber from which it is taken and dispensed to the nozzle after the nozzle has moved to its normal position.

It is, therefore, an object of the invention to provide an oiler for dispensing measured or regulated charges of lubricant through a piston-like motion of the nozzle and the action obtained by relative sidewise or vibratory motion by either the oiler or part to be oiled to which the parts are susceptible when in momentum, for an automatic periodic dispensing of the oil and adapting the supply to be cut off when the part to be lubricated is at rest.

Further objects and advantages will be more fully set forth in a description of the accompanying drawing, in which:

Figure 1 is a view illustrating the oiler in position for oiling the flange of a wheel or rotating member against which the nozzle end of the oiler engages, and the oiler is shown as fixed to the end of a tube or pipe depending from a reservoir supported upon a convenient stationary part of the locomotive with the reservoir shown in elevation and the wheel and part to which the reservoir is connected diagrammatically illustrated.

Fig. 2 is a section on line 2—2, Fig. 1.

Fig. 3 is an enlarged central section of the improved oiler.

Fig. 4 is a section on line 4—4, Fig. 3.

The oiler is primarily illustrated as applied to a stationary or frame part of a locomotive for oiling the flanges of a drive wheel.

Referring to the drawing, which discloses the oiler in its commercial adaptation as applied to a locomotive, 1 indicates the body of the oiler in the form of a hollow T fitting providing lateral internally threaded or tapped hub extensions 2, 3, one for making the supply pipe connection 4 which also serves for suspending the oiler in position for use, dependingly from oil reservoir 5, secured in position, and as shown the reservoir is fixed to a bracket 6 which in turn is fixed to a bar 7 representing the upper longitudinal slide bar of the engine cross-head.

Additional means are provided for rigidly supporting the oiler structure, and as shown comprises a bracket 8 fixed to the bar 7 and extended downwardly clamping to the pipe 4.

Various methods may be employed for mounting the oiler which is necessitated for different constructions of locomotives.

The second hub extension 3 is provided with a drain plug 9 for a valve chamber 10 within the head end of the body. The valve chamber 10 is surrounded by a cylindrical screen 11, one end of the screen engaging over the annular boss formed upon the inner end of a valve cap 12 screw-threaded into the head end of the body and the opposite end of the screen engages over an annular boss extending from one side of a web or septum 13 in the body and forming an end or base wall for the valve chamber against which a valve 14 seats to close a port 15 extended through the web.

The valve 14 is provided with a guide stem 16 having its free end slidably engaged into a bore of a valve cap 12. The valve is depressed against its seat by a spring 17 surrounding the valve guide stem 16 between the cap and valve, the spring normally holding the valve closed.

The valve controls the admission of oil from the valve chamber 10 to a dispensing chamber 18 within the barrel or cylinder portion 19 of the body and at the head end of a hollow or tubular plunger 20 sliding or reciprocating within the barrel. The head end or rear of the plunger is counterbored to slidably receive the forward or head end of a stem 21 extending from the forward side of the valve 14 and to form a seat therefor.

The valve stem 21 extends centrally through the dispensing chamber and into the head end of the plunger with its forward or free end tapered or conical to serve as a valve and engaged with the seat 22 in the head end of the plunger to close the bore of the plunger against the admission of oil when the plunger is in a retracted position, and also provide a shouldered connection between the plunger and valve stem for actuating or opening the valve 14 when the plunger is retracted to admit oil from the valve chamber, which is open to the supply from the reservoir, into the dispensing chamber 18.

The head end of the plunger is provided with an annular groove 23 connecting with the counterbore of the plunger by lateral ports 24 for furnishing a limited supply of oil for distribution through the bore of the plunger and nozzle 25 concentrically engaged into the forward end of the plunger. When the plunger is in a foremost position the valve or head end of the stem 21 is disengaged from its seat and the annular passage 24 closed against communication with the dispensing chamber 18 by the cylindrical walls of the barrel. The dispensing chamber is of larger diameter than the diameter of the plunger adapting the annular passage to be open to communication with the dispensing chamber when the plunger is retracted with its head end projected or dipping into the dispensing chamber.

The forward end of the barrel is provided with a collar 26 screw-threaded thereon for guidingly supporting the nozzle 25 and confine the plunger within the barrel.

The oiler in position for use is arranged in relation to the flange of a wheel so that the forward end of the nozzle just touches the flange on a horizontal center line with the axle of the wheel and at a slight inclination to permit the oil to flow through the nozzle by gravity and be deposited upon the flange of the wheel, any excess dropping to the ground and not upon the traction surface of the wheel. In setting, the nozzle touches the flange when all side motion is taken up on the opposite side of the locomotive or at the inner extreme of the side motion of the flange or wheel so that when the wheel side motion is in an opposite direction it will retract the nozzle and its plunger, engaging or seating the valve stem 21 with the plunger to move therewith, unseating the valve 14, opening the dispensing chamber to the valve chamber for replenishing the dispensing chamber and also opening the annular groove 23 of the plunger to the valve chamber to receive a charge of oil for delivery and discharge when the parts are moved to a reverse or normal position.

The feed or distribution of the oil to the part to be lubricated is periodical in regulated quantities. In the use of the oiler for oiling railway wheel flanges, sidewise motion effecting the operation of the oiler is more predominant at the curves of the railway, when lubrication of the flanges of the wheels is most required. An automatic and economic distribution of the oil is obtained only when the part to be lubricated is in service.

According to the relative arrangement of moving parts the oil is drained from the annular groove only when closed to the dispensing chamber. When open thereto, it is closed to the discharge passage or bore of the plunger or nozzle. The dispensing of the oil is intermittent and in quantities according to the capacity of the annular groove including the lateral ports in the plunger.

The nozzle is never at any time directly open to the supply from the reservoir making it impossible to distribute oil to the wheel flanges in quantities which would be detrimental as an excess of oil would be liable to spread to the tread or traction surface and cause it to slip on the rail. It is obvious that the oiler is adapted for oiling any member or its bearing which has lateral motion or motion which will reciprocate the plunger.

Having described my invention, I claim:

1. A lubricator, comprising, a hollow body interiorly providing a supply chamber and a dispensing chamber connected by a port, a valve for closing said port, a tubular plunger reciprocable in a cylindrical portion of said body, its inner end adapted to dip into said dispensing chamber in a retreat stroke of the plunger for collecting a charge of oil, a rod extending from said valve coaxially with the bore of the plunger to close the bore against the admission of oil in a retreat stroke of the plunger and to connect the plunger and valve for unseating the valve.

2. A lubricator, comprising, a hollow body, a tubular plunger reciprocable in a cylindrical portion of said body, having one end projecting therefrom to contact with a flange of a wheel for actuating said plunger, the opposite end of the plunger having one or more lateral ports normally communicating with the bore of the plunger and open to a chamber at the rear end of the plunger when the plunger is depressed, and a valve for controlling communication between said ports and plunger bore, whereby when the ports are open to the chamber and the plunger is depressed they are closed to the bore.

3. A lubricator, comprising, a hollow body interiorly providing a supply chamber and a dispensing chamber connected by a port, a tubular plunger reciprocable in a cylindrical portion of said body, having one end projecting therefrom to contact with a flange of a wheel for actuating said plunger, the opposite end of the plunger having one or more lateral ports normally communicating with the bore of the plunger and with a dispensing chamber in the body at the rear end of the plunger when the plunger is depressed, and a valve actuated by the plunger for controlling communication between said supply and dispensing chambers, the valve having an extension engaging with the plunger for closing communication between the port and plunger bore when the plunger is depressed.

In witness whereof, I hereunto subscribe my name.

ELMER O. COREY.